Nov. 17, 1936.    F. W. COTTERMAN    2,061,220
OVERRUNNING CLUTCH
Filed June 25, 1935

INVENTOR
Frederick W. Cotterman

Patented Nov. 17, 1936

2,061,220

UNITED STATES PATENT OFFICE 2,061,220

OVERRUNNING CLUTCH

Frederick W. Cotterman, Dayton, Ohio, assignor of one-half to Bessie D. Apple, Dayton, Ohio Application June 25, 1935, Serial No. 28,306

10 Claims. (Cl. 192—46)

This invention relates to overrunning clutches, sometimes referred to as unidirectional clutches or as free-wheeling units, wherein two axially aligned rotatable members are provided with clutching means whereby either member may drive the other when rotating in one of its two directions but is unable to drive said other when rotating oppositely.

Devices of this character as heretofore made usually depend upon frictional contact of parts carried by one of the rotatable members with a cylindrical surface of the other rotatable member, the parts in frictional contact with the cylinder being necessarily pressed thereagainst with great force to prevent slippage when power is being transmitted from one member to the other.

Jaw clutches, of course, do not depend on frictional contact for driving engagement, and these may be successfully employed as overrunning clutches where the speed of rotation is very low, but where the jaw members of such clutches are spring pressed into engagement, any considerable speed of rotation while the members are operating overrunningly produces an objectionable clatter due to the jaws riding over each other.

It is therefore an object of this invention to provide an overrunning clutch having jaw clutch means for connecting the driving and driven members in driving relation, together with mechanism operative to fully engage or fully disengage the jaw clutch means as the driving and driven members respectively begin to drive or begin to overrun.

Another object is to provide an overrunning jaw clutch with jaw operating means which is responsive to the torque being transmitted to create an axial movement for engaging or disengaging an axially movable jaw clutch member as the mechanism respectively begins to drive or begins to overrun.

Another object is to provide an overrunning jaw clutch with guiding means whereby an axially movable jaw clutch member will be so guided in its axial movement toward jaw engagement that its teeth will always be guided into the spaces between the teeth of the other jaw member.

Other objects will become apparent as the invention is described in detail and reference is had to the drawing, wherein, Fig. 1 is a longitudinal axial section thru the overrunning clutch showing it as it appears when fully engaged in driving relation.

Similar numerals refer to similar parts thruout the several views.

Figure 1:
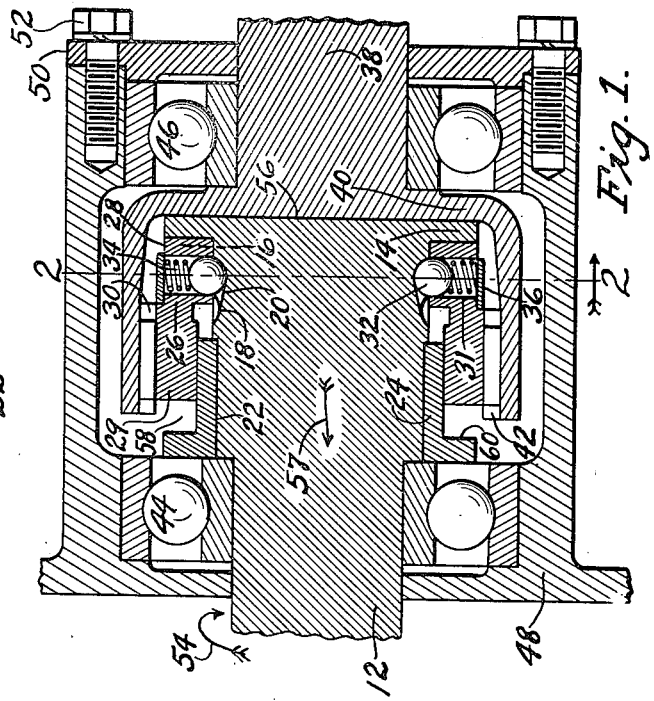

In the drawing the drive shaft 12 is enlarged at the end to provide the jaw member 14 having unidirectional driving teeth 16. A round bottomed groove 18 extends completely around the shaft. From this circular groove, at equally spaced points around it, the round bottomed guide grooves 20 extend helically toward the jaw member 14. The helix of the backs of the unidirectional jaw teeth and the helix of the guide grooves are of the same hand.

Figure 4:
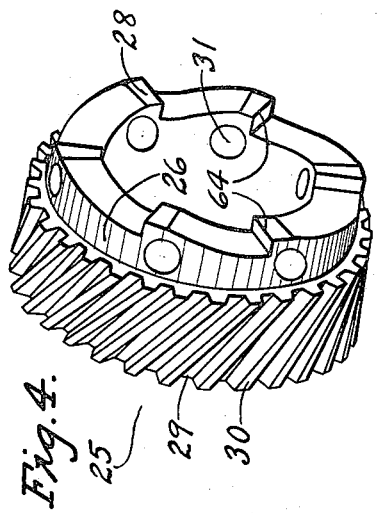
Fig. 4 is a detail perspective view of the other jaw member having the torque responsive jaw operating means integral.
Figure 2:
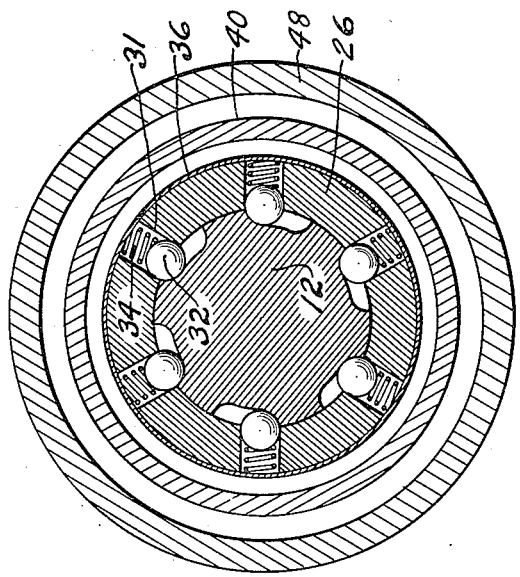
Fig. 2 is a transverse section, taken at 2—2 of Fig. 1, showing the guide and follower mechanism.

Press fitted to a portion 22 of the shaft 12 is the bearing bushing 24 upon which a member 25, Fig. 4, comprising the jaw member 26 having unidirectional driving teeth 28 and a clutch operating member 29 having external helical splines 30 may rotate when the jaw clutch teeth 16 and 28 are not engaged. The helical splines 30 are the opposite hand of the guide grooves 20.

The clutch member 26 has a series of equally spaced radial openings 31, equal in number to the guide grooves 20. Balls 32 fit snugly but slidably in openings 31 and are pressed radially inward by the springs 34 against the bottoms of the guide grooves 20 or the bottom of the circular groove 18 depending upon whether the teeth of the respective jaw members are in the engaged or disengaged relation. A circular band 36 is fitted tightly around the jaw member 26 to hold the springs and balls in place.

Guide grooves 20 are somewhat deeper at their closed ends (see Fig. 1) than they are where they open out into the circular groove 18. The radially inward pressure of the springs 34 against the balls 32 therefore has some tendency to move the jaw member 26 into engagement with the jaw member 14.

The function, however, of the spring impressed balls in the guide grooves is not so much to assist in moving the jaw members into engagement as it is to act as followers for guiding the jaw members in such manner that their respective teeth 28 and 16 will approach each other in proper relation for correct engagement.

Fig. 1 shows the jaw members 26 and 14 in full engagement. In this position the followers 32 are at the closed or deepest ends of the guide grooves 20. The jaw members may therefore not move out of engagement except by drawing the followers 32 along the guide grooves 20 toward the circular groove 18.

The driven shaft 38 is provided with a cup 40 having internal helical splines 42 which are in mesh with and freely slidable on the external splines 30 of the member 29. The drive shaft 12 and the driven shaft 38 are rotatably supported in coaxial alignment by the ball bearings 44 and 46, held in the ends of the housing 48. The housing 48 is closed by the cover 50 held on by screws 52.

Operation

Should the device be in full driving engagement as shown in Fig. 1, and the drive shaft 12 be rotated forwardly in the direction of the arrow 54, against the load resistance of the driven shaft 38, the jaw members 26 and 14 will be held together in engagement by the end thrust action of the helical splines 30 and 42 with a force substantially as great as the tangential torque load being transmitted at the pitch line of the said splines. The driving and driven shafts 12 and 38 will also have their end surfaces at 56 drawn together with a force equal to that which is drawing the jaw members together. There is, consequently no end thrust on the ball bearings 44 and 46 when the device is operating in driving relation.

If, while the device is in the condition shown in Fig. 1 the force which is rotating the shaft 12 in the direction of the arrow 54 is withdrawn, thereby permitting the shaft 38 to overrun the shaft 12, there is substantially instantaneous cooperation between the helical splines 30 and 42, the guide grooves 20 and followers 32 and the unidirectional driving jaw teeth 28 and 16 to disengage the jaw members 26 and 14.

When the shaft 38 overruns the shaft 12, the operating member 29 moves in the direction of the arrow 57 into the space 58, the followers 32 move out of the guide grooves 20 and into the circular groove 18, and the ends of the jaw teeth 28 are drawn clear of the ends of the jaw teeth 16 an amount preferably equal to about the depth of the teeth. Further overrunning of the shaft 38 rotates the followers 32 around and around in the circular groove 18.

The springs 34 may preferably be of such strength that the torque required to rotate the followers 32 around the groove 18 will not exceed ½ foot pound. With springs of this strength the end thrust of the operating member 29 against the shoulder 60 of the bearing bushing 24 will not exceed four pounds while the device is overrunning. This small thrust is, of course, of no consequence as far as wear is concerned, but is sufficient to insure that the jaw clutch members will be always urged out of engagement as long as the device is overrunning.

When power is again applied to the shaft 12 to rotate it in the direction of the arrow 54, the slightest effort of the shaft 12 to exceed the speed of the shaft 38 results in a reversal of the four pound end thrust created by the helical splines 30 and 42 rotating the followers 32 in the circular groove 18 whereupon the operating member 29 starts to move axially in a direction opposite to the arrow 57. If this start is made at a position where the followers 32 strike the raised points 62, Fig. 3, the followers merely rise against the pressure of the springs 34 and ride over the points 62 and enter the pockets next adjacent to those which they attempted to enter too late.

When the followers 32 have moved about half of the total travel from the circular groove 18 to the ends of the guide grooves 20, the ends of the teeth 28 begin to enter the spaces between the ends of the teeth 16.

Figure 3:
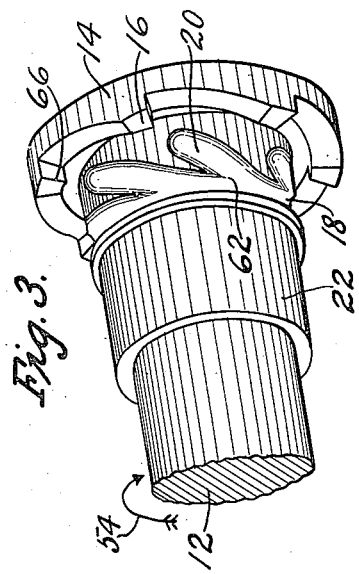
Fig. 3 is a detail perspective view of the rotating member which carries one of the jaw members and the guiding means, and may herein be called the driving member, altho it may operate equally well as a driven member when used for operation in the opposite direction.

The followers 32 and guide grooves 20 being so positioned in relation to the teeth 28 and 16 that the teeth 28 and 16 are fully in engagement when the followers are at the extreme closed ends of the guide grooves, it is obvious that at the time the ends of the teeth 28 start to enter the spaces between the ends of the teeth 16 the ends of the teeth 28 will be situated circumferentially somewhere between the ends of the teeth 16, which insures that the corner 64, Fig. 4, of a tooth 28 will never strike a corner 66, Fig. 3, of a tooth 16 when the teeth are engaging.

This is highly important, for if it were not for the guide grooves and followers, it would happen every so often that a corner 64 would catch a corner 66 with a very shallow hold whereupon the heavy load carried by the shallow hold would cause it to slip off and cause an interruption in the torque transmission which would produce a jerk in the mechanism in which the device was being employed. This shallow partial engagement would be repeated at ever shorter intervals until the corners 64 and 66 would be worn so round as to make driving engagement without danger of slipping off very uncertain.

While I have designated 12 as the driving and 38 as the driven members of the device shown, it is obvious that the device would operate equally well as an overrunning clutch for rotation oppositely of the arrow 54 if 38 were made the driving and 12 the driven members.

Having described an embodiment of my invention, I claim:

1. An overrunning clutch comprising, two rotatable members, an operating member, a jaw clutch member on one rotatable member, a second jaw clutch member on the operating member engageable with the first for connecting the one said rotatable member with the operating member, helical splines connecting the operating member to the second rotatable member, said splines being angled to cause movement of the operating member to effect engagement of the jaw clutch members whenever the first rotatable member tries to pass the rotative speed of the second, and guide and follower means associated with the first rotatable member and operating member for guiding the clutch engaging movement of said clutch operating member so that the jaw clutch members approach their engaged relation with the teeth of one intermediate the teeth of the other.

2. The combination, in an overrunning clutch, of two rotatable members, an operating member, jaw clutch means engageable by axial movement of the operating member for connecting one rotatable member to the operating member, said jaw clutch means having unidirectional driving teeth, helical splines connecting the operating member to the second rotatable member angled to cause axial movement of the operating member toward clutch engagement when the first rotatable member tries to exceed the rotative speed of the second, and helical guide means associated with the first rotatable member and the operating member angled to guide the unidirectional teeth helically toward engagement, while keeping the teeth carried by the operating member intermediate the teeth on the rotatable member.

3. In an overrunning clutch, the combination of two rotatable members, a clutch operating member, unidirectional jaw clutch teeth on one rotatable member, corresponding jaw clutch teeth on the clutch operating member engageable with the first said jaw teeth, helical splines on the clutch operating member, corresponding helical splines on the second rotatable member in constant engagement with the first said helical splines, and helical guide means connecting the clutch operating member and the first said rotatable member operative to guide the unidirectional teeth helically toward engagement while keeping the teeth carried by the operating member intermediate the teeth on the rotatable member, the helix of the backs of the unidirectional teeth and the helix of the guide means being both of the same hand, and the helix of the splines being of the opposite hand.

4. An overrunning clutch comprising, in combination, a rotatable member having a series of unidirectional jaw clutch teeth and an equal number of helical guide grooves all of the same hand, a second rotatable member, axially movable with respect to the first member, having corresponding jaw clutch teeth engageable with the first said jaw clutch teeth, and followers extending into said guide grooves, one of the two said members having helical splines of opposite hand as the guide grooves, and a third rotatable member having helical splines in constant engagement with the first said splines.

5. The combination, in an overrunning clutch, of a rotatable member having a series of unidirectional jaw clutch teeth and an equal number of helical guide grooves of the same hand as the jaw clutch teeth, said guide grooves all terminating in a circular groove, a second rotatable member axially movable with respect to the first member, having corresponding jaw clutch teeth engageable with the first said jaw clutch teeth by said axial movement, and followers extending into said circular groove when said second member has been moved axially to the clutch disengaging position and following said helical guide grooves as said second member is moved axially to the clutch engaging position, one of the two said members having helical splines of opposite hand as the guide grooves, and a third rotatable member having helical splines in constant engagement with the first said helical splines.

6. The structure defined in claim 5 wherein the guide grooves get deeper as they recede from the circular groove.

7. The structure defined in claim 5 wherein the followers have spherical inner ends and the guide grooves and circular groove are arcuate in cross section to correspond thereto.

8. The structure defined in claim 5 wherein springs constantly urge the followers against the bottoms of either the circular groove or the guide grooves.

9. The combination, in an overrunning clutch, of a rotatable member having a series of unidirectional jaw clutch teeth and an equal number of helical guide grooves of the same hand as the jaw clutch teeth, said guide grooves all terminating in a circular groove, the cross section of the grooves being arcuate, a second rotatable member, helically movable with respect to the first, having corresponding jaw clutch teeth engageable with the first said jaw clutch teeth by said helical movement, a series of spherical followers carried by said second rotatable member adapted to extend into said circular groove when said second rotatable member is in the clutch disengaging position but to follow said helical guide grooves when said second rotatable member is moved to the clutch engaging position, springs pressing said followers against the bottoms of said grooves, helical splines on the second said member, said splines being of opposite hand as the guide grooves, and a third rotatable member having helical splines in constant engagement with the first said helical splines.

10. An overrunning clutch comprising, two rotatable members, an operating member for drivably connecting said rotatable members, helical spline means drivably connecting one rotatable member to the operating member, and mating jaw clutch parts operable axially for connecting the other rotatable member to the operating member, helical guides rotatable in unison with one clutch part, followers rotatable in unison with the other clutch part, resilient means pressing said followers into frictional engagement with said helical guides, there being an annular surface at the ends of said guides upon which the resilient means may press the followers when they are withdrawn from the said guides, said helical spline means being so angled that load applied thereto causes the followers to move from the said annular surface into the said guides and further along the said guides, whereby the said mating jaw clutch parts are guided into engagement with the teeth of one intermediate the teeth of the other.

FREDERICK W. COTTERMAN.